United States Patent
Yeon et al.

(10) Patent No.: US 7,746,940 B2
(45) Date of Patent: Jun. 29, 2010

(54) METHOD AND APPARATUS FOR TRANSMITTING A SIGNAL IN A COMMUNICATION SYSTEM

(75) Inventors: Hae-Dong Yeon, Bucheon-si (KR); Young-Hak Kim, Suwon-si (KR); Jae-Hwan Chang, Suwon-si (KR); Jae-Yong Lee, Seongnam-si (KR); Min-Cheol Park, Suwon-si (KR); Ji-Yun Seol, Seongnam-si (KR); Tae-Gon Kim, Seoul (KR); Jun-Kyu Kang, Seoul (KR); In-Hyoung Kim, Seongnam-si (KR); Yun-Sang Park, Suwon-si (KR); Bong-Gee Song, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 945 days.

(21) Appl. No.: 11/481,032

(22) Filed: Jul. 5, 2006

(65) Prior Publication Data

US 2007/0009056 A1    Jan. 11, 2007

(30) Foreign Application Priority Data

Jul. 5, 2005    (KR) ...................... 10-2005-0060456

(51) Int. Cl.
*H04K 1/10*    (2006.01)
*H04L 27/28*   (2006.01)

(52) U.S. Cl. ..................................................... 375/260
(58) Field of Classification Search .................. 375/260
See application file for complete search history.

(56) References Cited

U.S. PATENT DOCUMENTS

2006/0256881 A1\* 11/2006 Yonge et al. ................. 375/260
2007/0009056 A1\*  1/2007 Yeon et al. ................... 375/260

\* cited by examiner

*Primary Examiner*—David C Payne
*Assistant Examiner*—Tanmay K Shah
(74) *Attorney, Agent, or Firm*—The Farrell Law Firm, LLP

(57) ABSTRACT

A method and apparatus for processing time windowing to transmit a signal in a Broadband Wireless Access (BWA) communication system based on Orthogonal Frequency Division Multiple Access (OFDMA). A signal of a first interval included in a previous symbol prior to a current symbol is stored as a signal of a previous symbol interval. The current symbol includes a guard interval and an effective symbol interval subsequent to the guard interval. The current symbol is windowed by overlapping the stored signal of the first interval with a signal of a second interval included in the current symbol subsequent to the previous symbol. A windowed signal is transmitted.

7 Claims, 7 Drawing Sheets

METHOD AND APPARATUS FOR TRANSMITTING A SIGNAL IN A COMMUNICATION SYSTEM

PRIORITY

This application claims priority under 35 U.S.C. §119 to an application filed in the Korean Intellectual Property Office on Jul. 5, 2005 and assigned Serial No. 2005-60456, the contents of which are incorporated herein by reference.

BACKGROUND OF THE INVENTION

1. Field of the Invention

The present invention generally relates to a communication system, and more particularly to a method and apparatus for performing a time windowing process to transmit a signal in a Broadband Wireless Access (BWA) communication system based on an Orthogonal Frequency Division Multiple Access (OFDMA) scheme.

2. Description of the Related Art

Conventionally, Orthogonal Frequency Division Multiple Access (OFDMA) is a scheme for efficiently dividing and allocating frequency resources for users in a multi-user environment on the basis of an Orthogonal Frequency Division Multiplexing (OFDM) scheme. The OFDM scheme divides a data stream with a high transmission rate into multiple data streams with a low transmission rate and simultaneously transmits the multiple data streams in parallel using multiple subcarriers. This OFDM scheme has a high data rate and high spectral efficiency, and is robust to a frequency fading channel.

The OFDM scheme inserts a guard interval longer than the channel delay spread between OFDM symbols ("symbols") to prevent the orthogonality between subcarriers from being destroyed, thereby removing Inter-Symbol Interference (ISI). To ensure the continuity of a total symbol interval including the guard interval, a Cyclic Prefix (CP) is inserted into the guard interval. That is, when part of a symbol is copied and inserted into the guard interval as the CP and is added to a start part of the symbol, the symbol is cyclically extended, such that Inter-Carrier Interference (ICI) can be avoided.

The OFDM scheme implements a parallel subcarrier transmission with an Inverse Fast Fourier Transform (IFFT) at a transmitting side and a Fast Fourier Transform (FFT) at a receiving side. Subcarriers of an OFDM signal are constructed with a sinc function and overlap while maintaining the orthogonality between the subcarriers. Because the OFDM signal is not a band limited signal due to characteristics of the sinc function, it may interfere with an adjacent band.

To reduce the interference to the adjacent band, a method does not transmit data on all subcarriers in a frequency band, but never transmits a signal on some subcarriers at both ends of an associated band. However, because the side lobe of the sinc function itself is relatively large, the number of subcarriers on which no data is transmitted should significantly increase to remove the interference to the adjacent band. However, in this case, the spectral efficiency is significantly degraded.

Therefore, time windowing is mainly used to reduce interference with an adjacent band while maintaining the spectral efficiency. When the time windowing is used, the side lobe can be effectively reduced. Among many windows used in the windowing scheme, a raised cosine window is widely used.

Raised cosine windowing schemes using the raised cosine window are raised cosine windowing of a 1-symbol interval (a "1-symbol interval windowing scheme") and raised cosine windowing of a 3-symbol interval (a "3-symbol interval windowing scheme"). The 1-symbol interval windowing scheme will be described with reference to FIG. 1.

Referring to FIG. 1, $T_s$ is a 1-symbol interval as a symbol period, $T_g$ is a guard interval, and $T_b$ is an effective symbol interval. As illustrated in FIG. 1, one symbol is constructed with the guard interval $T_g$ and the effective symbol interval $T_b$ subsequent thereto. As described above, a rear part to be used for the guard interval $T_g$ within the effective symbol interval $T_b$ is copied and inserted as a CP.

Assuming that a time domain OFDM signal to be transmitted is x(n), a transmission signal s(n) windowed in the 1-symbol interval windowing scheme is defined as shown in Equation (1). A time windowing coefficient w(n) is defined as shown in Equation (2).

$$s(n) = w(n) \times x(n), \text{ for } 0 \leq n \leq N_s - 1 \quad \text{Equation (1)}$$

$$w(n) = \begin{cases} 0.5 \times \left(1 + \cos\left(\pi \times \left(1 + \frac{n}{m}\right)\right)\right), & 0 \leq n \leq m \\ 1, & m \leq n < N_s - m \\ 0.5 \times \left(1 + \cos\left(\pi \times \frac{n - ((N_s - 1) - m)}{m}\right)\right), & N_s - m \leq n \leq N_s - 1 \end{cases} \quad \text{Equation (2)}$$

In Equations (1) and (2), $N_s$ is the number of time samples with respect to the symbol period $T_s$, and m is a window size.

As shown in Equations (1) and (2), it can be seen that a transmitter of the OFDM system performs a windowing process of the 1-symbol interval by multiplying an interval from a start point of the symbol period $T_s$ to a first window size m ("a first time") by $$0.5 \times \left(1 + \cos\left(\pi \times \left(1 + \frac{n}{m}\right)\right)\right)$$

with respect to a signal of the symbol period $T_s$ in FIG. 1, multiplying an interval up to ($N_s$−m) ("a second time") after the first time by 1, and multiplying an interval up to an end of the symbol period after the second time by $$0.5 \times \left(1 + \cos\left(\pi \times \frac{n - ((N_s - 1) - m)}{m}\right)\right).$$

Because the interval up to the second time after the first time is multiplied by 1, the resulting signal is equal to an original signal. The interval from the start of the symbol period $T_s$ to the first time and the interval from the second time to the end of the second time are windowing intervals in which the original signal is actually distorted by the windowing.

The 3-symbol interval windowing scheme will be described with reference to FIG. 2.

Referring to FIG. 2, $T_s$ is a 1-symbol interval as a symbol period, $T_g$ is a guard interval, and $T_b$ is an effective symbol interval. As illustrated in FIG. 2, the 3-symbol interval windowing scheme is a windowing scheme for overlapping a prefix $T_{prefix}$ and postfix $T_{postfix}$ of the current symbol with a signal of the previous symbol and a signal of the next symbol.

Assuming that a time domain OFDM signal to be transmitted is x(n), a transmission signal s(n) windowed in the 3-symbol interval windowing scheme is defined as shown in Equation (3). A time windowing coefficient w(n) is defined as shown in Equation (4).

$$s(n) = w(n) \times \sum_{\substack{k=-N_{used}/2 \\ k \neq 0}}^{N_{used}/2} b_k \exp((j2\pi k \Delta f)(n - N_s)), \quad \text{Equation (3)}$$

for $-m \leq n \leq N_s + m$ $$w(n) = \quad \text{Equation (4)}$$

$$\begin{cases} 0.5 \times \left(1 + \cos\left(\pi \times \left(1 + \frac{n+m}{2m}\right)\right)\right), & -m \leq n < m \\ 1, & m \leq n \leq N_s - m \\ 0.5 \times \left(1 + \cos\left(\pi \times \frac{n - (N_s - m)}{2m}\right)\right), & N_s - m < n \leq N_s - m \end{cases}$$

In Equations (3) and (4), $N_s$ is the number of time samples with respect to the symbol period $T_s$, and m is a window size. $b_k$ is a frequency domain signal to be transmitted on a k-th subcarrier, $N_g$ is the number of time samples during the guard interval $T_g$, and $N_{used}$ is the number of subcarriers except virtual subcarriers on which no signal is transmitted among all subcarriers mapped to an IFFT size. That is, $N_{used}$ is the number of subcarriers to which a pilot or data can be allocated among all the subcarriers mapped to the IFFT size.

Because a signal is artificially distorted in the above-described windowing scheme, there is a problem in that Error Vector Magnitude (EVM) of the system is degraded and hardware complexity increases due to windowing. Specifically, a scheme for performing a windowing process during a 1-symbol interval is simply implemented and has a superior effect on sidelobe attenuation, but has a bad effect on EVM performance.

In detail, EVM is defined as shown in Equation (5), and becomes a measure of modulation accuracy in a transmitter. EVM is an important parameter for implementing a transmission system together with a spectrum mask and should always satisfy conditions predefined in the standard of a particular OFDM system.

$$EVM = \sqrt{\frac{\frac{1}{N}\sum_i^N (\Delta I^2 + \Delta Q^2)}{S_{max}^2}} \quad \text{Equation (5)}$$

In Equation (5), $S_{max}^2$ is the maximum magnitude of the outermost constellation point among constellation points, $\Delta I^2$ is an error vector of real, i.e., in-phase axes, $\Delta Q^2$ is an error vector of imaginary axes, i.e., quadrature phase axes, and N is the number of subcarriers.

FIG. 3 illustrates EVM measurement results according to window size of the 1-symbol interval windowing scheme.

Referring to FIG. 3, it can be seen that EVM degrades as the window size increases when the window size m is 4, 8, 12, 16, 24, and 32 with respect to a transmission signal of a modulation scheme such as Quadrature Phase Shift Keying (QPSK) and Quadrature Amplitude Modulation (QAM). Thus, it is difficult for the 1-symbol interval windowing scheme to satisfy the EVM condition.

On the other hand, the 3-symbol interval windowing scheme has a lower degradation level in the EVM performance in comparison with the 1-symbol interval windowing scheme, but has a problem in implementation. In other words, because the 3-symbol interval windowing scheme should know a signal of the next symbol to transmit the current symbol, a processing delay occurs during a 1-symbol interval. Thus, there is a problem in that control logic and buffer sizes increase. Furthermore, there is another problem in that hardware complexity increases when the 3-symbol interval windowing scheme is used.

SUMMARY OF THE INVENTION

It is, therefore, an object of the present invention to provide a method and apparatus for transmitting a signal in a communication system.

It is another object of the present invention to provide a method and apparatus for transmitting a signal that can remove the influence on Error Vector Magnitude (EVM) without a windowing delay when a windowing process is performed for the signal transmission in a communication system.

In accordance with an aspect of the present invention, there is provided a method for transmitting a signal in a communication system, which includes storing a signal of a first interval included in a previous symbol prior to a current symbol as a signal of a previous symbol interval, the current symbol including a guard interval and an effective symbol interval subsequent to the guard interval; and windowing the current symbol by overlapping the stored signal of the first interval with a signal of a second interval included in the current symbol subsequent to the previous symbol and transmitting a windowed signal.

In accordance with another aspect of the present invention, there is provided an apparatus for transmitting a signal in a communication system, including a symbol buffer for storing a signal of a first interval included in a previous symbol prior to a current symbol as a signal of a previous symbol interval, the current symbol including a guard interval and an effective symbol interval subsequent to the guard interval; and a windowing processor for windowing the current symbol by overlapping the stored signal of the first interval with a signal of a second interval included in the current symbol subsequent to the previous symbol and transmitting a windowed signal.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for clarity and conciseness.

The present invention provides a method and apparatus for transmitting a signal in a communication system, for example, using Orthogonal Frequency Division Multiplexing (OFDM)/Orthogonal Frequency Division Multiple Access (OFDMA). In the present invention, a method and apparatus are disclosed for performing a windowing process to transmit a signal such that spectral efficiency is improved and interference between adjacent frequency bands is reduced in the communication system. In the present invention, an example of transmitting a signal in a raised cosine windowing scheme using a raised cosine window in a communication system based on OFDM/OFDMA will be described below. Of course, the signal transmission method and apparatus of the present invention can be also applied to communication systems using other schemes. The signal transmission apparatus of the communication system of the present invention will be described in detail with reference to FIG. 4.

Figure 1:
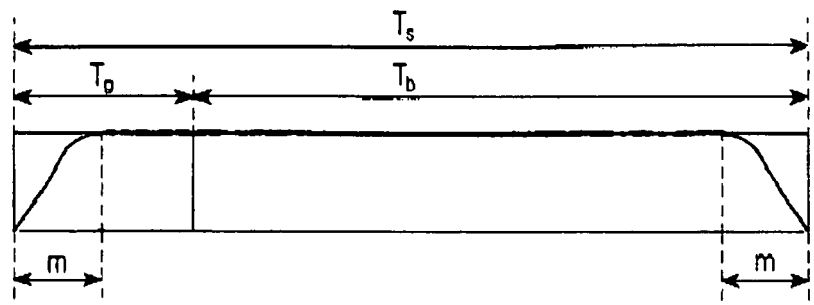
FIG. 1 illustrates a scheme for windowing of a 1-symbol interval.
Figure 2:
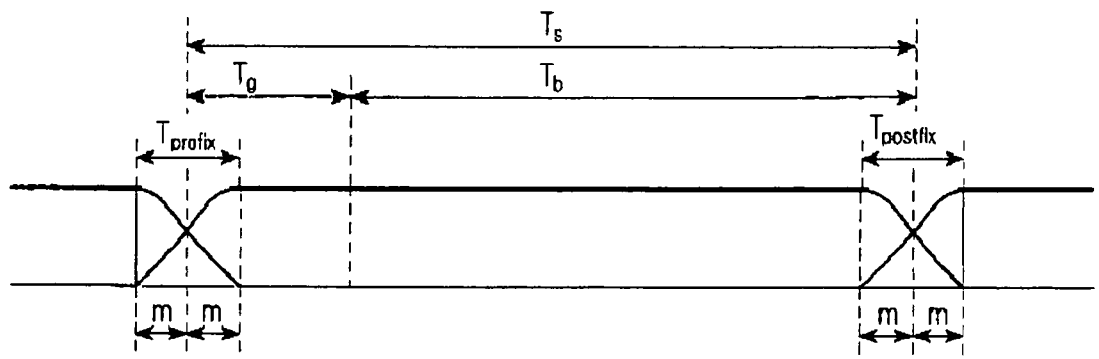
FIG. 2 illustrates a scheme for windowing of a 3-symbol interval.
Figure 3:
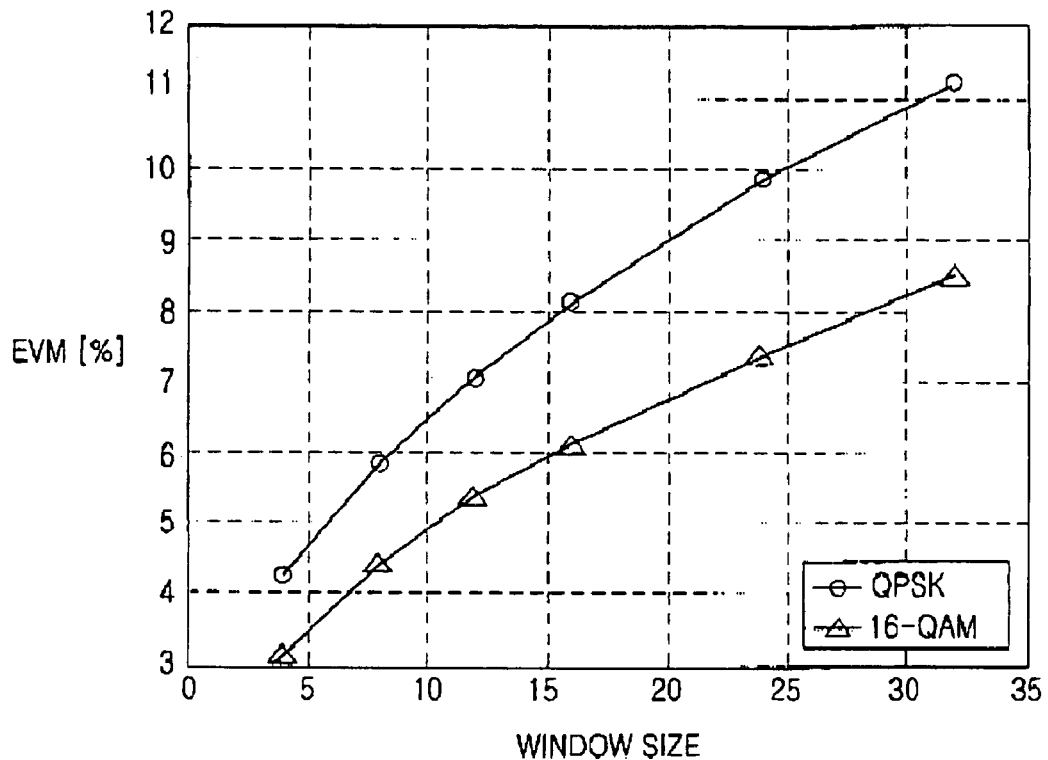
FIG. 3 illustrates Error Vector Magnitude (EVM) measurement results according to window size of the 1-symbol interval windowing scheme.
Figure 4:
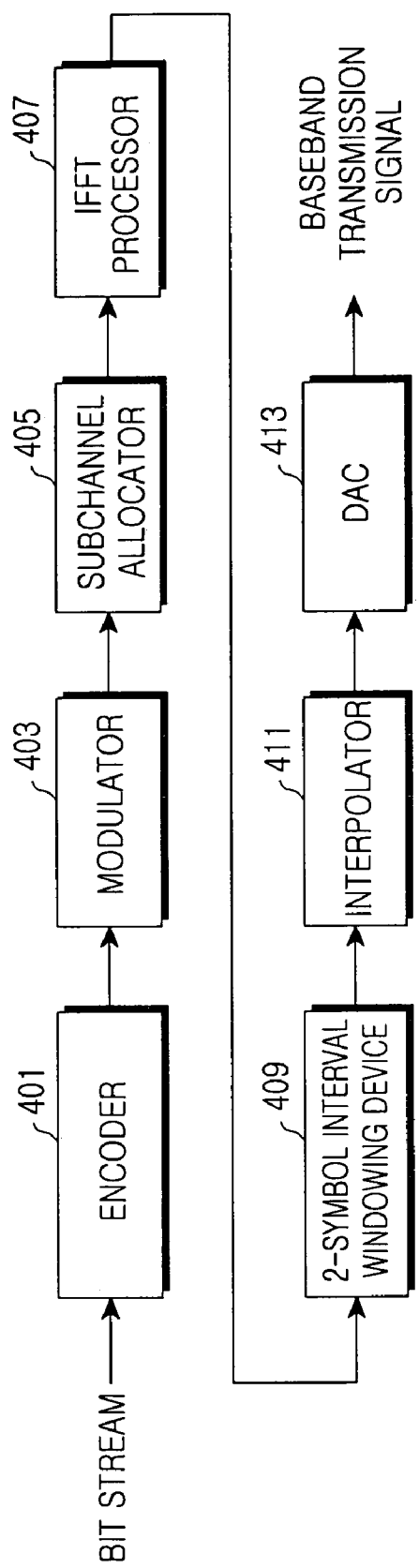
FIG. 4 schematically illustrates a structure of a transmitter in a communication system in accordance with the present invention.

FIG. 4 schematically illustrates a structure of a transmitter in a communication system in accordance with the present invention. Herein, FIG. 4 illustrates an example in which a windowing device placed between an Inverse Fast Fourier Transform (IFFT) processor 407 and an interpolator 411 is replaced with a device 409 for raised cosine windowing of a 2-symbol interval ("2-symbol interval windowing") in accordance with the present invention.

Referring to FIG. 4, the transmitter includes an encoder 401, a modulator 403, a subchannel allocator 405, the IFFT processor 407, the 2-symbol interval windowing device 409, the interpolator 411, and a Digital to Analog Converter (DAC) 413. The encoder 401 performs a channel coding process for a bit stream of data to be transmitted. The modulator 403 modulates an encoded signal. The subchannel allocator 405 allocates the modulated signal from the modulator 403 to subcarriers allocated to the current symbol. The IFFT processor 407 performs an IFFT process for a signal in which allocation of a 1-symbol interval is completed, thereby generating a time domain signal. The 2-symbol interval windowing device 409 performs the below-described 2-symbol interval windowing process for the time domain signal output from the IFFT processor 407 in accordance with the present invention. The interpolator 411 performs a 2× or 4× interpolation on the time domain signal windowed by the 2-symbol interval windowing device 409. The DAC 413 converts a digital signal output from the interpolator 411 into an analog signal and outputs a baseband transmission signal. Herein, the encoder 401 employs, for example, a Forward Error Correction (FEC) encoder. The 2-symbol interval windowing device 409 in the transmitter of the communication system in accordance with the present invention will be described in detail with reference to FIG. 6.

Figure 6:
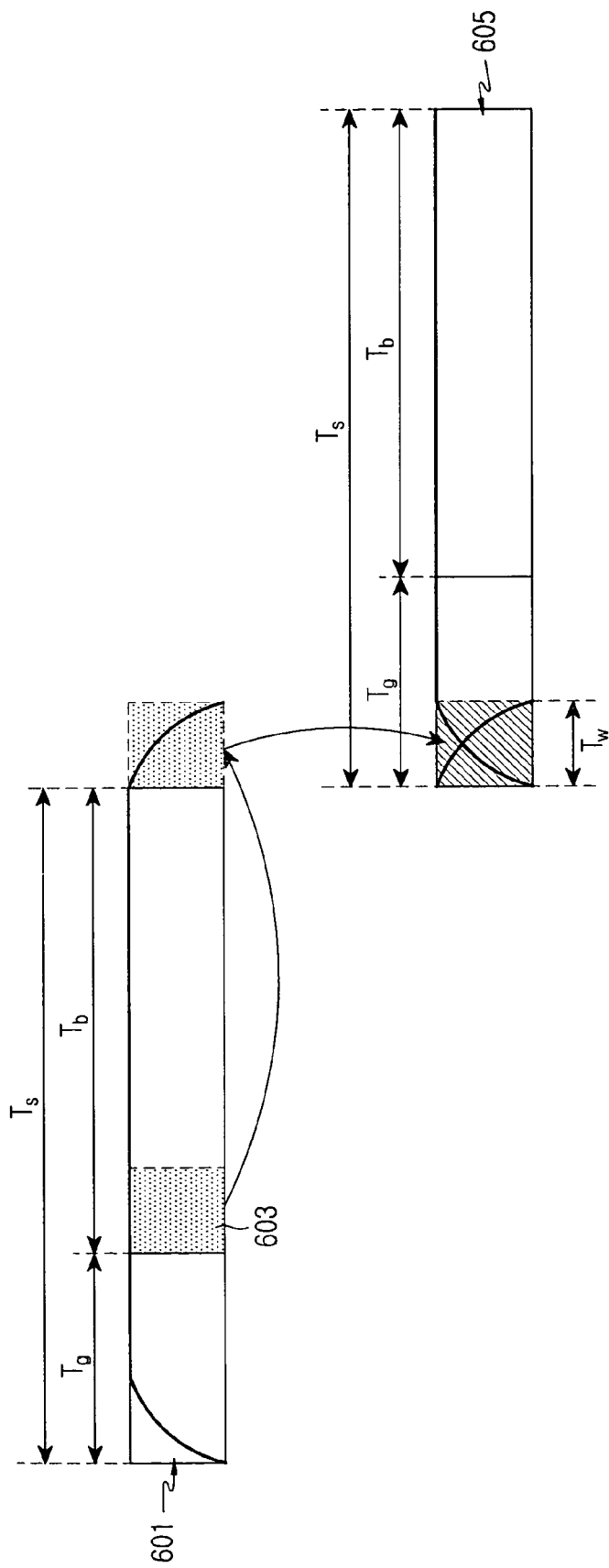
FIG. 6 illustrates a scheme for windowing of a 2-symbol interval in the communication system in accordance with the present invention.

FIG. 6 illustrates a 2-symbol interval windowing scheme in the communication system in accordance with the present invention.

Referring to FIG. 6, the 2-symbol interval windowing process of the 2-symbol interval windowing device 409 is performed within a guard interval $T_g$ using data of a 2-symbol interval. In other words, the 2-symbol interval windowing device 409 windows the current symbol by overlapping a signal 603 mapped to an interval corresponding to a window size from the beginning of an effective symbol interval $T_b$ of a previous symbol 601 with a signal mapped to a windowing interval $T_w$ corresponding to the window size from the beginning of the guard interval $T_g$ of a current symbol 605. At this time, a size of the windowing interval $T_w$ is smaller than that of the guard interval $T_g$.

Herein, the current symbol 605 is a symbol to be windowed. The previous symbol 601 is a symbol prior to the current symbol 605. For convenience of explanation, the signal 603 mapped to the interval corresponding to the window size from the beginning of the effective symbol interval $T_b$ of the previous symbol 601 is referred to as the previous symbol interval signal, and the signal mapped to the windowing interval $T_w$ corresponding to the window size from the beginning of the guard interval $T_g$ of the current symbol 605 is referred to as the current symbol interval signal. Thus, a size of the current symbol interval is smaller than that of the guard interval.

In the windowing process, the previous and current symbol interval signals overlap by adding them. That is, after the current symbol interval signal is multiplied by a preset first windowing coefficient and also the previous symbol interval signal is multiplied by a preset second windowing coefficient, the current symbol interval signal multiplied by the first windowing coefficient is added to the previous symbol interval signal multiplied by the second windowing coefficient. The first and second windowing coefficients can be defined as shown in Equation (6).

$$W_1(n) = 0.5 \times \left(1 + \cos\left(\pi \times \left(1 + \frac{n}{\text{win\_size}}\right)\right)\right), \quad \text{for } n = 0, \ldots, \text{win\_size} - 1$$

$$W_2(n) = 1 - W_1(n), \quad \text{for } n = 0, \ldots, \text{win\_size} - 1$$

Equation (6)

In Equation (6), $W_1(n)$ and $W_2(n)$ are the first windowing coefficient and the second windowing efficient, respectively, and win_size is a window size.

A signal generated by the above-described 2-symbol interval windowing can be defined as shown in Equation (7).

Out_data($n$)=in_data($n$)×$W_1(n)$+sym_buff($n$)×$W_2(n)$,
for n=0, . . . ,win_size−1

Out_data(n)=in_data(n), for n=win_size, . . . ,symbol_size−−1    Equation (7)

In Equation (7), in_data(n) is a signal input from the IFFT processor 407 to the 2-symbol interval windowing device 409, and are time samples of a symbol to be windowed. Out_data(n) is a signal output from the 2-symbol interval windowing device 409, and are time samples of the windowed symbol. sym_buff(n) are time samples of the above-described previous symbol interval signal. win_size is a window size, i.e., the number of time samples of the windowing interval $T_w$. symbol_size is a symbol size, i.e., the number of time samples of the 1-symbol interval $T_s$.

On the other hand, as illustrated in FIG. 6, the previous symbol interval signal 603 is a signal continuously connected to the last signal of the previous symbol 601. Like the above-described 3-symbol interval windowing, the 2-symbol interval windowing of the 2-symbol interval windowing device 409 is implemented by overlapping adjacent symbol data with the window size in the transmitter of the communication system in accordance with the present invention. However, 2-symbol interval windowing does not require the next symbol data subsequent to the current symbol, which is different from 3-symbol interval windowing, such that a processing delay does not occur. Because data distortion due to windowing occurs only in the guard interval $T_g$ and is independent of the effective symbol interval $T_b$, it does not affect Error Vector Magnitude (EVM).

Figure 5:
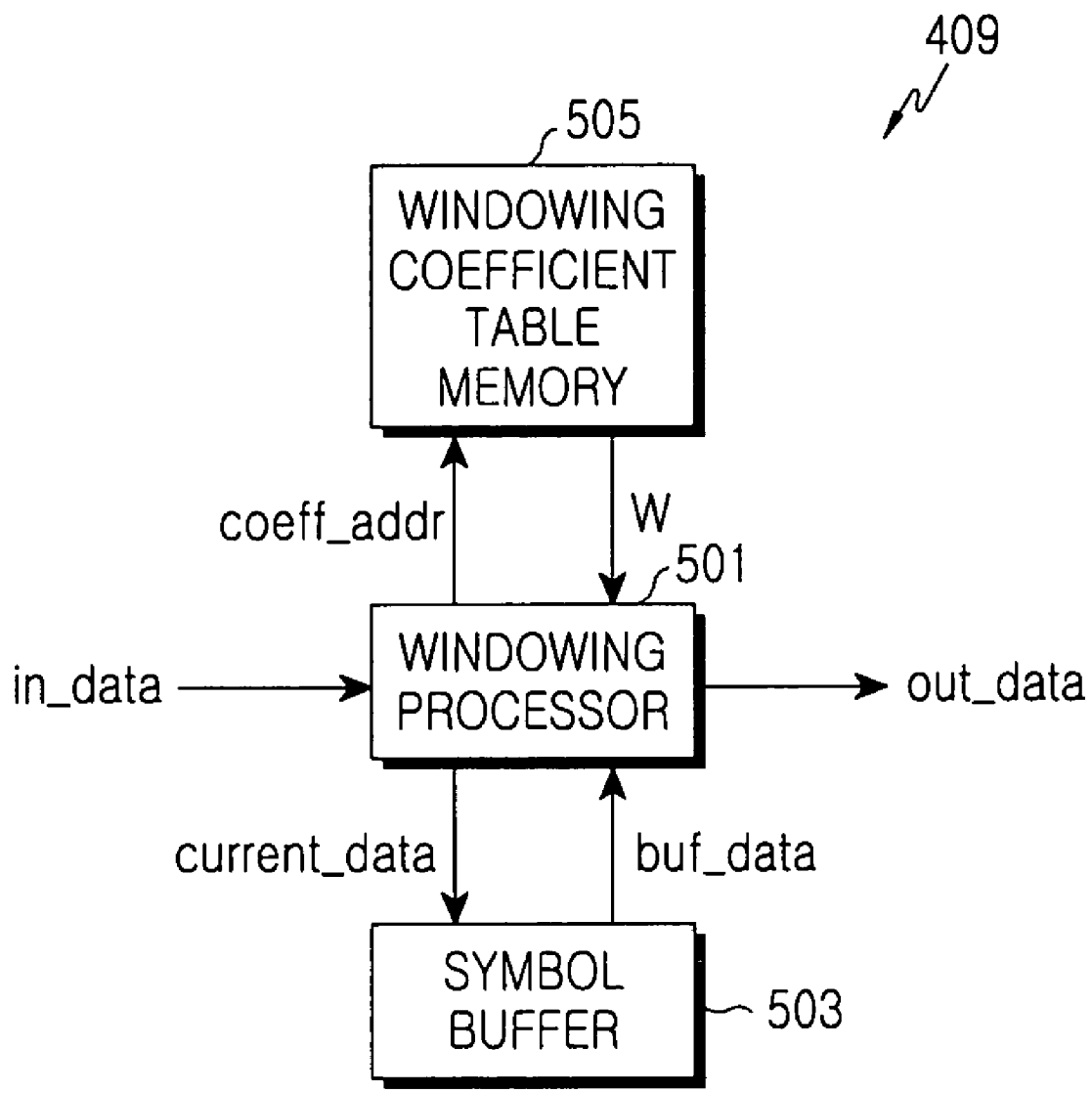
FIG. 5 schematically illustrates a device for windowing of a 2-symbol interval in the transmitter of the communication system in accordance with the present invention.

FIG. 5 schematically illustrates the 2-symbol interval windowing device 409 of the transmitter in the communication system in accordance with the present invention.

Referring to FIG. 5, the 2-symbol interval windowing device 409 includes a windowing processor 501, a symbol buffer 503, and a windowing coefficient table memory 505. The windowing processor 501 performs a 2-symbol interval windowing process for data in_data input from the IFFT processor 407 and outputs the windowed data Out_data to the interpolator 411. The windowing processor 501 is implemented by operation logic according to the flowchart of FIG. 7. A concrete operation of the 2-symbol interval windowing processor 501 will be described below with reference to FIG. 7, and is omitted with respect to the description of FIG. 5.

The symbol buffer 503 stores a previous symbol interval signal extracted by the windowing processor 501. Specifically, after the symbol buffer 503 receives data current_data mapped to an interval corresponding to the window size from the beginning of the effective symbol interval of the current symbol and stores the data current_data as data buf_data, it transfers the stored data buf_data to the windowing processor 501 when the windowing process is performed for the next symbol. At this time, current_data and buf_data correspond to the previous symbol interval signal.

The windowing coefficient table memory 505 pre-stores windowing coefficients that are mapped to time samples in the form of a table, respectively. Among the windowing coefficients pre-stored in the form of the table, a windowing coefficient W is transferred to the windowing processor 501. The windowing coefficient W is mapped to a time sample to be currently processed that is mapped to a windowing coefficient address coeff_addr designated by the windowing processor 501. In the following description, it is assumed that the windowing coefficient W stored in the windowing coefficient table memory 505 is the first windowing coefficient $W_1(n)$ of the first and second windowing coefficients $W_1(n)$ and $W_2(n)$ as shown in Equation (7) and the second windowing coefficient $W_2(n)$ is computed from the first windowing coefficient $W_1(n)$.

Figure 7:
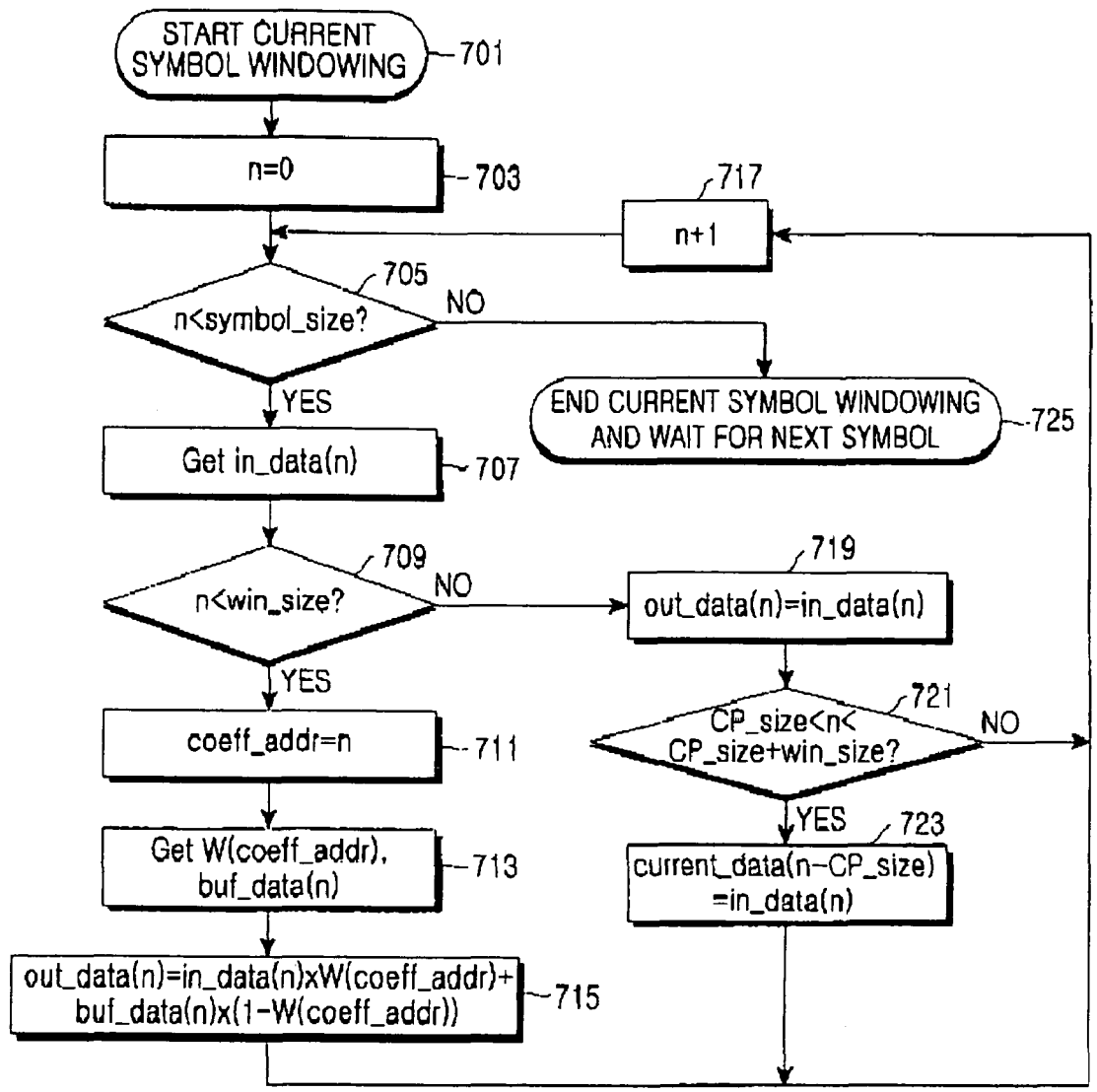
FIG. 7 illustrates a windowing operation of a 2-symbol interval in a windowing processor of the transmitter of the communication system in accordance with the present invention.

FIG. 7 illustrates a 2-symbol interval windowing operation of the windowing processor 501 of FIG. 5 in the transmitter of the communication system in accordance with the present invention. As illustrated in FIG. 7, the windowing operation of the windowing processor 501 is performed once per symbol interval.

Referring to FIG. 7, when the windowing processor 501 starts the windowing operation on the current symbol in step 701, a time sample variable n is initialized to 0 in step 703.

In step 705, the windowing processor 501 determines whether the time sample variable n is less than the symbol size symbol_size. The time sample variable n is less than the symbol size symbol_size when the current symbol is not completely windowed. When the current symbol is completely windowed, the time sample variable n is not less than the symbol size symbol_size.

If the time sample variable n is less than the symbol size symbol_size as a determination result, the windowing processor 501 proceeds to step 707. In step 707, the windowing processor 501 receives data in_data(n) mapped to the time sample variable n of the current symbol from the IFFT processor 407.

Next, in step 709, the windowing processor 501 determines whether the time sample variable n is less than a window size win_size. If the time sample variable n is less than a window size win_size as a determination result in step 709, the windowing process is performed because a time sample to be currently windowed is present in a windowing interval of the current symbol.

After setting a windowing coefficient address coeff_addr to n in step 711, the windowing processor 501 receives a windowing coefficient W(coeff_addr) mapped to the windowing coefficient address coeff_addr from the windowing coefficient table memory 505 and receives the associated sample data buf_data of a previous symbol interval signal mapped to the time sample variable n in step 713. In step 715, the windowing processor 501 multiplies sample data in_data (n) corresponding to the current symbol interval signal by the windowing coefficient W(coeff_addr), multiplies the sample data buf_data(n) corresponding to the previous symbol interval signal by the windowing coefficient 1−W(coeff_addr), computes a sum of multiplication results, and outputs windowed sample data out_data(n).

When one time sample is completely windowed, the windowing processor 501 increments the time sample variable n by 1 in step 717 and proceeds to step 705 to repeat the windowing process for the next time sample. In steps 711 to 715, the windowing processor 501 processes time samples of the windowing interval $T_w$, i.e., time samples where the time sample variable n is from 0 to a window size win_size−1 as shown in Equation (7). The windowing coefficient W(coeff_addr) is the first windowing coefficient $W_1(n)$ of Equation (7), and the windowing coefficient 1−W(coeff_addr) is the second windowing coefficient $W_2(n)$ of Equation (7). Also, buf_data(n) corresponds to sym_buff(n) of Equation (7).

The time sample variable n is greater than or equal to the window size win_size in step 709 when the windowing process is completed for the time samples where the time sample variable n of the current symbol is from 0 to a window size win_size−1 through the repeat operation of the windowing processor 501 in steps 711 to 715 as described above. Then, the windowing processor 501 proceeds to step 719 to output an input data sample in_data(n) as an output data sample out_data(n). In steps 721 and 723, the windowing processor 501 stores a signal mapped to a windowing interval corresponding to the window size from the beginning of the effective symbol interval of the current symbol as the previous symbol interval signal to be used to process the next symbol.

In detail, the windowing processor 501 determines whether the time sample variable n is a value between CP_size and (CP_size+win_size) in step 721. CP_size is a guard interval size and (CP_size+win_size) is a sum of the guard interval size CP_size and the window size win_size. That is, the windowing processor 501 determines whether the current time sample corresponds to the previous symbol interval signal 603 of FIG. 6 in step 721. If the current time sample of the time sample variable n corresponds to the previous symbol interval signal 603 as a determination result in step 721, the windowing processor 501 stores the current time sample as the previous symbol interval signal relative to the next symbol in the symbol buffer 503 in step 723. That is, the windowing processor 501 stores the current sample data in_data(n) as the previous symbol interval signal current_data(n-CP_size) mapped to the current sample variable n in the symbol buffer 503.

When the windowing process is completed for one time sample corresponding to the previous symbol interval signal as described above, the windowing processor 501 increments the time sample variable n by 1 in step 717 and proceeds to step 705 to repeat the windowing process for the next time sample. In step 721, the operation of the windowing processor 501 is performed on time samples where the time sample variable n is from the window size win_size to the symbol size symbol_size−1.

When the previous symbol interval signal is completely stored with respect to time samples where the time sample variable n is from the window size win_size to the symbol size symbol_size−1 through a repeat operation of the windowing processor 501 in step 723, the time sample variable n is greater than or equal to (CP_size+win_size) corresponding to a sum of the guard interval size and the window size in step 721. Then, without performing step 723, the windowing processor 501 outputs the input data sample in_data(n) as the output data sample out_data(n) while incrementing the time sample variable n by 1 in step 717.

When the windowing processor 501 completely windows the current symbol, the time sample variable n is greater than or equal to the symbol size symbol_size in step 705. Then, the windowing processor 501 ends the current symbol windowing and waits for the next symbol in step 725.

Figure 8:
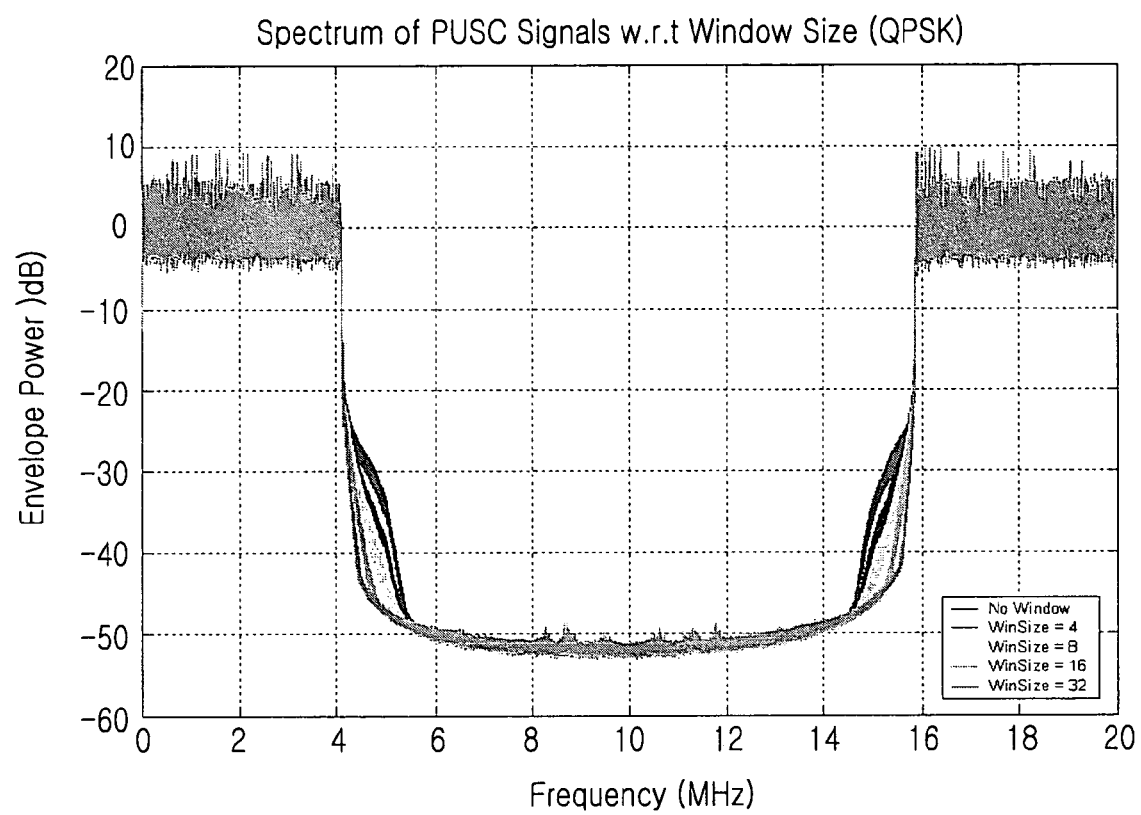
FIG. 8 illustrates performance measurement results according to windowing of a 2-symbol interval in accordance with the present invention.

FIG. 8 illustrates performance measurement results according to 2-symbol interval windowing in accordance with the present invention. Herein, FIG. 8 illustrates spectral characteristics according to window size when the 2-symbol interval windowing is applied in the case where the transmitter of the communication system transmits a signal on a subchannel of an uplink Partial Usage of Subchannel (PUSC) in a 1024 FFT based on the Institute of Electrical and Electronics Engineers (IEEE) 802.16 d/e standard. The PUSC is one form of an uplink diversity subchannel. Because the PUSC is not directly related to the present invention, a concrete description thereof is omitted herein.

As illustrated in FIG. 8, in the case where the above-described 2-symbol interval windowing is applied when the transmitter transmits a signal, the side lobe slope between a pass band and a stop band becomes steep as the window size increases. This characteristic can effectively reduce interference to an adjacent band, and can effectively attenuate a stop band incapable of being reduced by windowing when a Surface Acoustic Wave (SAW) filter is employed in a Radio Frequency (RF) processor.

In accordance with the present invention, one example in which the 2-symbol interval windowing device 409 is provided with the windowing coefficient table memory 505 has been described. Alternatively, after Equation (6) is computed and a windowing coefficient is computed, the windowing processor 501 may also use the computed windowing efficient at the time of windowing. In this case, the windowing coefficient table memory 505 is unnecessary. There has been described one example in which only the first windowing coefficient $W_1(n)$ is stored in the windowing coefficient table memory 505 and the stored first windowing coefficient $W_1(n)$ is transferred to the windowing processor 501. Alternatively, the second windowing coefficient $W_2(n)$ as well as the first windowing coefficient $W_1(n)$ may be stored and the stored first and second windowing coefficients $W_1(n)$ and $W_2(n)$ may be transferred to the windowing processor 501. In this case, the windowing processor 501 is not necessary to compute the second windowing coefficient $W_2(n)$.

In accordance with the present invention as described above, when a transmitter transmits a signal in a communication system, windowing of a 2-symbol interval is performed by overlapping adjacent symbol data in a window size similar to windowing of a 3-symbol interval. The 2-symbol interval windowing does not require data of the next symbol subsequent to the current symbol, which is different from the 3-symbol interval windowing. Thus, when the windowing process is performed, a time delay in processing of signals does not occur.

Furthermore, since data distortion due to windowing occurs only within a guard interval regardless of an effective symbol interval, EVM is never affected. The present invention can easily implement a 2-symbol interval windowing device of the transmitter for windowing with a simple symbol buffer and operation logic, thereby decreasing hardware complexity.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for transmitting a signal in a communication system including a symbol buffer and a windowing processor, comprising the steps of:

storing, by the symbol buffer, a signal of a first interval included in a previous symbol prior to a current symbol as a signal of a previous symbol interval, the current symbol including a guard interval and an effective symbol interval subsequent the guard interval; and windowing, by the windowing processor, the current symbol based on a window size by overlapping the stored signal of the first interval with a signal of a second interval included in the current symbol subsequent to the previous symbol and transmitting a windowed signal, wherein the first interval is an interval corresponding to the window size from a start point of the effective symbol interval included in the previous symbol, wherein the second interval is an interval corresponding to the window size from a start point of the guard interval included in the current symbol, wherein the windowing step comprises:

multiplying the signal of the second interval by a preset first windowing coefficient and multiplying the signal of the first interval by a preset second windowing coefficient; and adding and overlapping the signal of the second interval multiplied by the first windowing coefficient and the signal of the first interval multiplied by the second windowing coefficient, and wherein the first and second windowing coefficient are computed by:

$$W_1(n) = 0.5 \times \left(1 + \cos\left(\pi \times \left(1 + \frac{n}{\text{win\_size}}\right)\right)\right), \quad \text{for } n = 0, \ldots, \text{win\_size} - 1$$

$$W_2(n) = 1 - W_1(n), \quad \text{for } n = 0, \ldots, \text{win\_size} - 1$$

where $W_1(n)$ denotes the first windowing coefficient, $W_2(n)$ denotes the second windowing coefficient, and win size denotes sizes of the first and second intervals.

2. The method of claim 1, wherein the sizes of the first and second intervals are each equal to a window size.

3. The method of claim 2, wherein the window size is smaller than a size of the guard interval included in the current symbol.

4. An apparatus for transmitting a signal in a communication system, comprising:

a symbol buffer for storing a signal of a first interval included in a previous symbol prior to a current symbol as a signal of a previous symbol interval, the current symbol including a guard interval and an effective symbol interval subsequent the guard interval; and a windowing processor for windowing the current symbol based on a window size by overlapping the stored signal of the first interval with a signal of a second interval included in the current symbol subsequent to the previous symbol and transmitting a windowed signal, wherein the first interval is an interval corresponding to the window size from a start point of the effective symbol interval included in the previous symbol, wherein the second interval is an interval corresponding to the window size from a start point of the guard interval include in the current symbol, wherein the windowing processor multiplies the signal of the second interval by a preset first windowing coefficient, multiplies the signal of the first interval by a preset second windowing coefficient, and adds and overlaps the signal of the second interval multiplied by the first windowing coefficient and the signal of the first interval multiplied by the second windowing coefficient, and wherein the first and second windowing coefficient are computed by:

$$W_1(n) = 0.5 \times \left(1 + \cos\left(\pi \times \left(1 + \frac{n}{\text{win\_size}}\right)\right)\right), \quad \text{for } n = 0, \ldots, \text{win\_size} - 1$$

$$W_2(n) = 1 - W_1(n), \quad \text{for } n = 0, \ldots, \text{win\_size} - 1$$

where $W_1(n)$ denotes the first windowing coefficient, $W_2(n)$ denotes the second windowing coefficient, and win size denotes size of the first and second intervals.

5. The apparatus of claim 4, wherein the sizes of the first and second intervals are each equal to a window size.

6. The apparatus of claim 5, wherein the window size is smaller than a size of the guard interval included in the current symbol.

7. The apparatus of claim 4, further comprising:

a windowing coefficient table memory for storing at least one of the first and second windowing coefficients and transferring the at least one stored windowing coefficient to the windowing processor.

* * * * *